(12) United States Patent
Doi (10) Patent No.: US 12,198,857 B2
(45) Date of Patent: Jan. 14, 2025

(54) MULTILAYER CERAMIC CAPACITOR AND MOUNTING STRUCTURE OF MULTILAYER CERAMIC CAPACITOR

(71) Applicant: Murata Manufacturing Co., Ltd., Nagaokakyo (JP)

(72) Inventor: Akitaka Doi, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 253 days.

(21) Appl. No.: 17/979,029

(22) Filed: Nov. 2, 2022

(65) Prior Publication Data

US 2023/0207196 A1 Jun. 29, 2023

(30) Foreign Application Priority Data

Dec. 23, 2021 (JP) ................. 2021-209092

(51) Int. Cl.
| | |
|---|---|
| H01G 4/008 | (2006.01) |
| H01G 4/012 | (2006.01) |
| H01G 4/248 | (2006.01) |
| H01G 4/30 | (2006.01) |

(52) U.S. Cl.
CPC ............. *H01G 4/008* (2013.01); *H01G 4/012* (2013.01); *H01G 4/248* (2013.01); *H01G 4/30* (2013.01)

(58) Field of Classification Search
CPC .......... H01G 4/008; H01G 4/248; H01G 4/30; H01G 4/2325; H01G 4/0085; H01G 4/12; H01G 4/1227; H01G 4/232; H01G 2/06; H01G 4/002; H01G 4/35; H05K 1/18
See application file for complete search history.

(56) References Cited

U.S. PATENT DOCUMENTS

| | | | |
|---|---|---|---|
| 2013/0319741 A1 | 12/2013 | Ahn et al. | |
| 2013/0321980 A1* | 12/2013 | Suzuki | H01G 4/1227 29/25.42 |
| 2015/0062775 A1 | 3/2015 | Shibasaki et al. | |

(Continued)

FOREIGN PATENT DOCUMENTS

| | | |
|---|---|---|
| JP | 2013-251522 A | 12/2013 |
| JP | 2015-065414 A | 4/2015 |
| JP | 2019-145684 A | 8/2019 |

*Primary Examiner* — David M Sinclair
*Assistant Examiner* — Daniel M Dubuisson
(74) *Attorney, Agent, or Firm* — Keating & Bennett, LLP (57) ABSTRACT

A multilayer ceramic capacitor includes dielectric layers and internal electrode layers. Internal electrode layers adjacent to a first main surface define first main surface-side internal electrode layers, and internal electrode layers adjacent to the second main surface define second main surface-side internal electrode layers, first solid solution layers including a second metal as a solid solution is provided at interfaces between the first main surface-side internal electrode layers and the dielectric layers, the interfaces being in the first main surface-side internal electrode layers, and second solid solution layers including the second metal as a solid solution is provided at interfaces between the second main surface-side internal electrode layers and the dielectric layers, the interfaces being in the second main surface-side internal electrode layers. A concentration of the second metal in the second solid solution layer is higher than that of the second metal in the first solid solution layer.

20 Claims, 6 Drawing Sheets

(56) References Cited

U.S. PATENT DOCUMENTS

| | | | |
|---|---|---|---|
| 2015/0155098 A1* | 6/2015 | Yamaguchi | H01G 13/00 156/89.16 |
| 2016/0358713 A1* | 12/2016 | Doi | H01G 4/0085 |
| 2017/0011850 A1* | 1/2017 | Kim | H01G 4/1227 |
| 2019/0259537 A1 | 8/2019 | Teraoka et al. | |
| 2019/0304696 A1* | 10/2019 | Kim | H01G 4/12 |
| 2020/0066452 A1* | 2/2020 | Cha | H01G 4/30 |
| 2022/0139630 A1* | 5/2022 | Yamada | H01G 4/30 |
| 2022/0238280 A1* | 7/2022 | Masuda | H01G 4/1218 |
| 2023/0084921 A1* | 3/2023 | Masuda | C04B 35/4682 361/301.4 |
| 2023/0094498 A1* | 3/2023 | Mizuno | C04B 35/47 361/301.4 |

* cited by examiner

MULTILAYER CERAMIC CAPACITOR AND MOUNTING STRUCTURE OF MULTILAYER CERAMIC CAPACITOR

CROSS REFERENCE TO RELATED APPLICATIONS

This application claims the benefit of priority to Japanese Patent Application No. 2021-209092 filed on Dec. 23, 2021. The entire contents of this application are hereby incorporated herein by reference.

BACKGROUND OF THE INVENTION

1. Field of the Invention

The present invention relates to a multilayer ceramic capacitor and a mounting structure of the multilayer ceramic capacitor.

2. Description of the Related Art

Multilayer ceramic capacitors have been known, each of which includes a multilayer body in which a plurality of dielectric layers made of a ceramic material and a plurality of internal electrode layers are laminated, and external electrodes provided at end surfaces of the multilayer body. The multilayer body includes an inner layer portion including a portion of the plurality of dielectric layers and the plurality of internal electrode layers, and a first outer layer portion and a second outer layer portion sandwiching the inner layer portion and each including a portion other than the portion of the plurality of dielectric layers. The first outer layer portion is provided adjacent to the first main surface, and the second outer layer portion is provided adjacent to the second main surface. Such multilayer ceramic capacitors are required to be further reduced in size (reduced in thickness) and increased in capacitance. Therefore, a ferroelectric material having a relatively high dielectric constant may be used as the material of dielectric layers.

However, since such dielectric layers have piezoelectricity and an electrostrictive property, stress and mechanical strain are generated when an electric field is applied. Such stress and mechanical strain are transmitted as vibrations to the board on which the multilayer ceramic capacitors are mounted. In this case, the entire board functions as an acoustic reflection surface, and "acoustic noise" is generated which is a vibration sound that becomes noise.

In order to suppress the occurrence of the "acoustic noise", multilayer ceramic capacitors have been known in which transmission of vibration from a multilayer ceramic capacitor to a board is suppressed by making the lower outer layer portion thicker than the upper outer layer portion (refer to Japanese Unexamined Patent Application Publication Nos. 2013-251522, 2015-65414, and 2019-145684).

However, when the thickness of the lower outer layer portion is increased, either a reduction in thickness (reduction in size) or an increase in capacitance of the multilayer ceramic capacitor is significantly impaired.

SUMMARY OF THE INVENTION

Preferred embodiments of the present invention provide multilayer ceramic capacitors and mounting structures of the multilayer ceramic capacitors that are each able to reduce or prevent the generation of "acoustic noise" without significantly reducing or preventing a reduction in thickness (reduction in size) and an increase in capacitance.

As a result of extensive investigation, the inventor of preferred embodiments of the present invention has discovered that the occurrence of "acoustic noise" can be reduced or prevented without significantly increasing the thickness of the lower outer layer portion by adjusting the coverage of the main component metal of the lower internal electrode layer.

A multilayer ceramic capacitor according to a preferred embodiment of the present invention includes a multilayer body including a plurality of dielectric layers made of a ceramic material, and a plurality of internal electrode layers laminated therein, the multilayer body further including a first main surface and a second main surface opposed to each other in a lamination direction, two side surfaces opposed to each other in a width direction which intersects the lamination direction, and two end surfaces opposed to each other in a length direction which intersects the lamination direction and the width direction, and two external electrodes provided at the two end surfaces of the multilayer body. Each of the plurality of internal electrode layers includes a first metal as a main component. Among the plurality of internal electrode layers, when defining internal electrode layers adjacent to the first main surface as first main surface-side internal electrode layers, and defining internal electrode layers adjacent to the second main surface as second main surface-side internal electrode layers, first solid solution layers including a second metal different from the first metal as a solid solution are provided at interfaces between the first main surface-side internal electrode layers and the dielectric layers, the interfaces being in the first main surface-side internal electrode layers, and second solid solution layers including the second metal as a solid solution are provided at interfaces between the second main surface-side internal electrode layers and the dielectric layers, the interfaces being in the second main surface-side internal electrode layers. A concentration of the second metal in the second solid solution layer is higher than a concentration of the second metal in the first solid solution layer.

A mounting structure of a multilayer ceramic capacitor according to a preferred embodiment of the present invention includes a circuit board, and a multilayer ceramic capacitor according to a preferred embodiment of the present invention. The multilayer ceramic capacitor is mounted on the circuit board so that the second main surface faces the circuit board.

According to preferred embodiments of the present invention, it is possible to reduce or prevent the generation of "acoustic noise" without significantly reducing or preventing a reduction in thickness (reduction in size) and an increase in capacitance of multilayer ceramic capacitors.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described with reference to the accompanying drawings. In the drawings, the same or corresponding portions are denoted by the same reference numerals.

Multilayer Ceramic Capacitor

Figure 1:
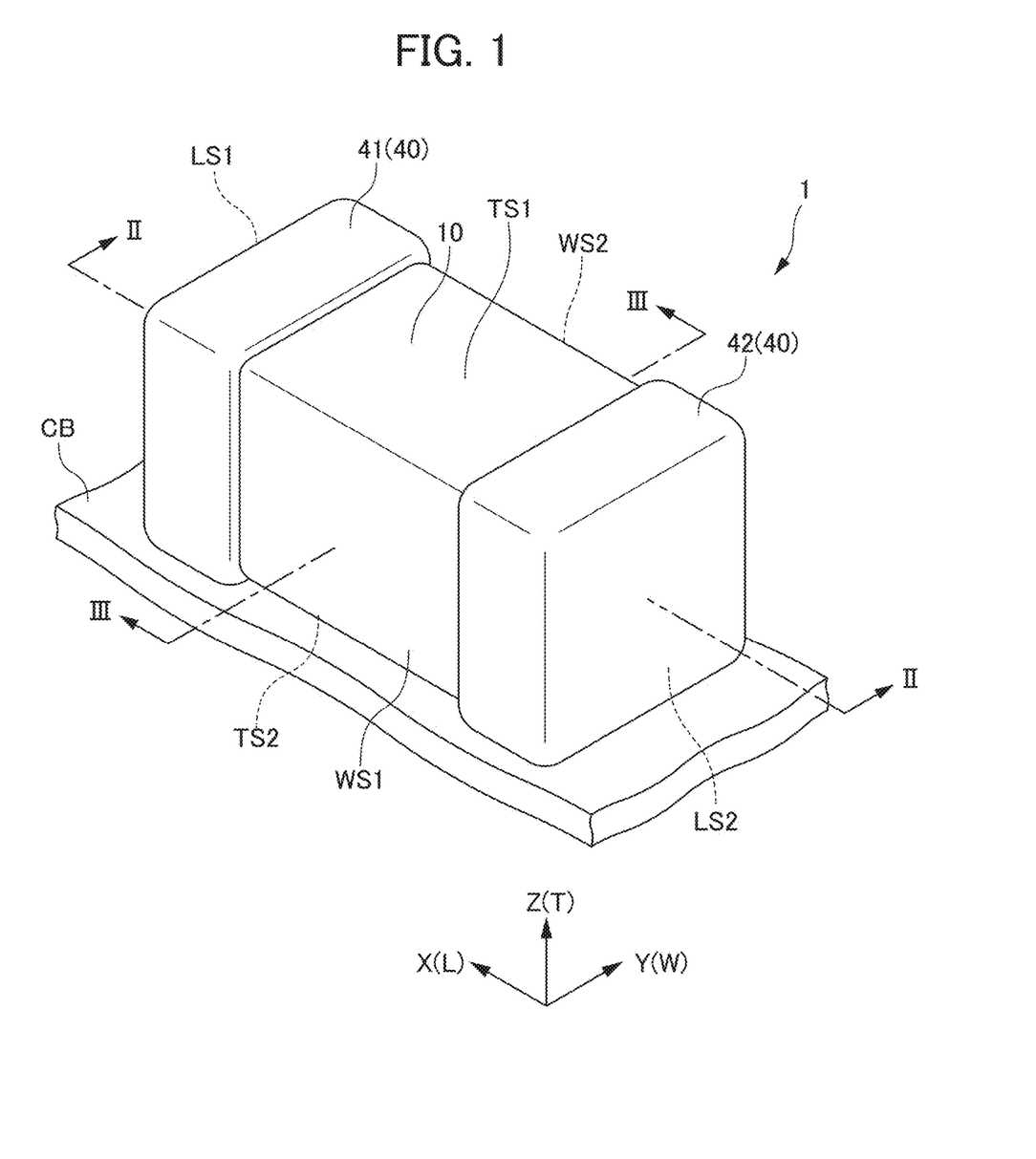
FIG. 1 is a perspective view of a multilayer ceramic capacitor and a mounting structure of the multilayer ceramic capacitor according to a preferred embodiment of the present invention.
Figure 2:
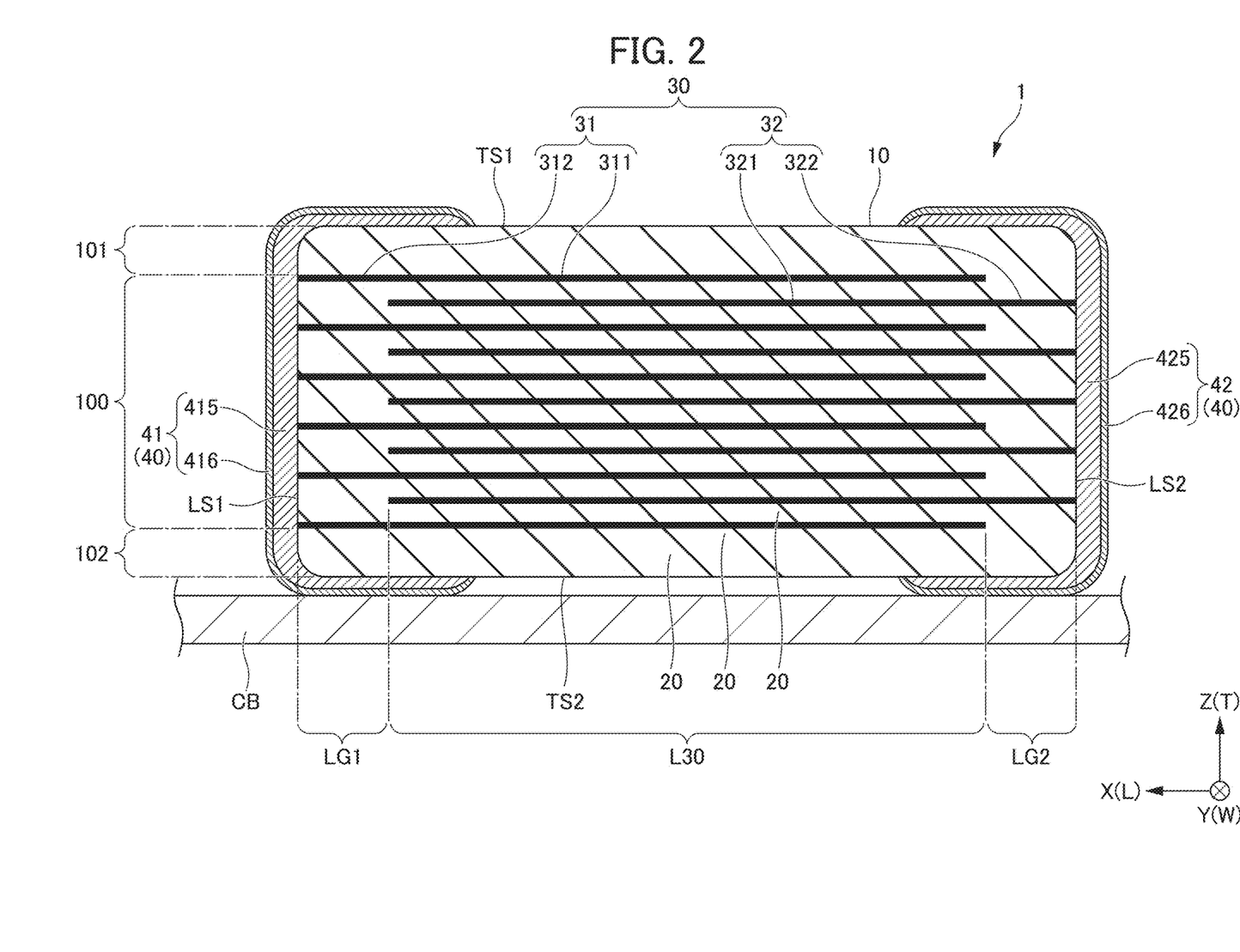
FIG. 2 is a cross-sectional view taken along the line II-II (cross section LT) of the multilayer ceramic capacitor and the mounting structure of the multilayer ceramic capacitor shown in FIG. 1.
Figure 3:
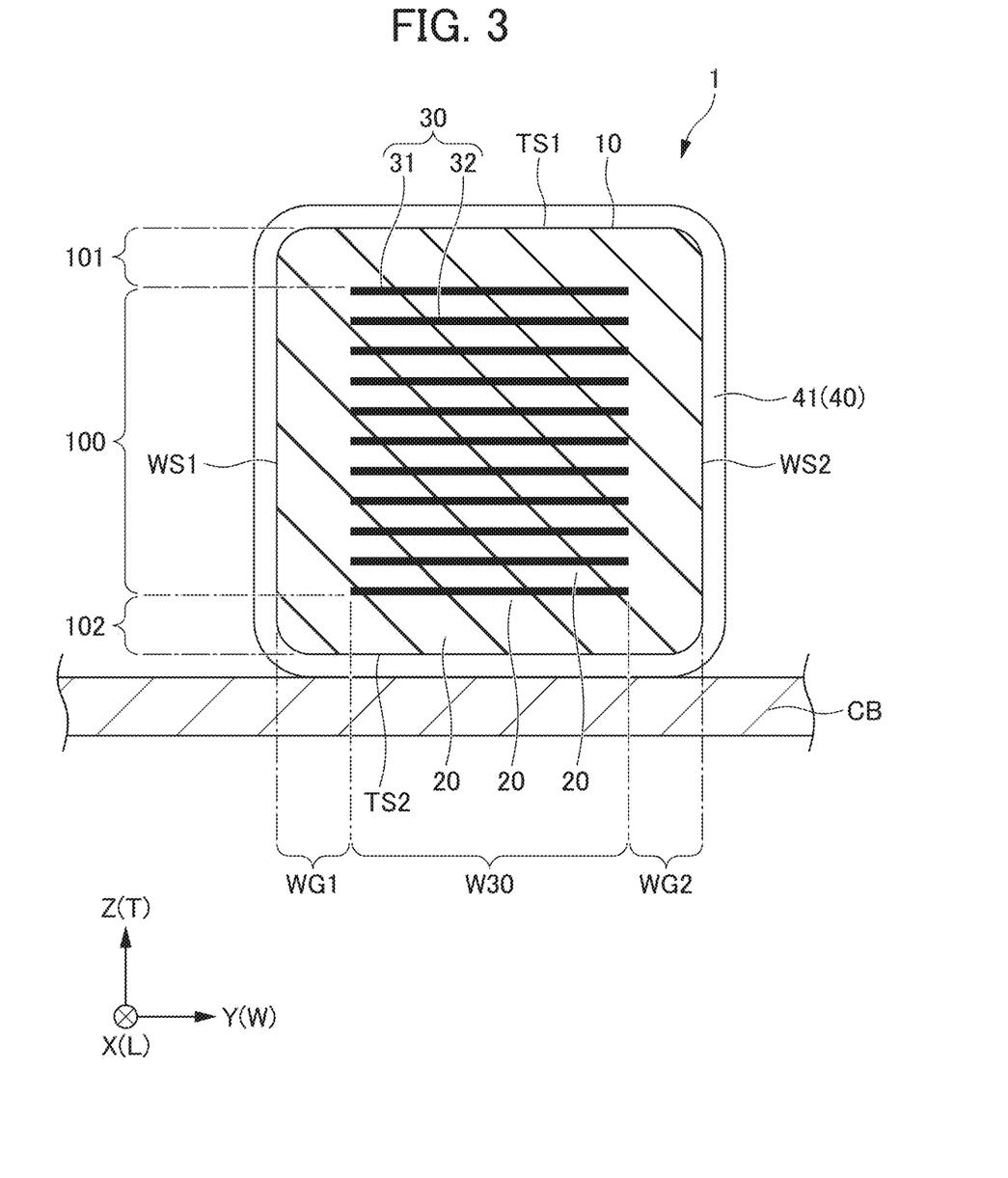
FIG. 3 is a cross-sectional view taken along the line III-III (cross section WT) of the multilayer ceramic capacitor and the mounting structure of the multilayer ceramic capacitor shown in FIG. 1.

FIG. 1 is a perspective view showing a multilayer ceramic capacitor according to a preferred embodiment of the present invention. FIG. 2 is a cross-sectional view taken along the line II-II of the multilayer ceramic capacitor shown in FIG. 1. FIG. 3 is a cross-sectional view taken along the line III-III of the multilayer ceramic capacitor shown in FIG. 1. The multilayer ceramic capacitor 1 shown in FIGS. 1 to 3 includes a multilayer body 10 and external electrodes 40. The external electrodes 40 include a first external electrode 41 and a second external electrode 42.

FIGS. 1 to 3 each show an XYZ orthogonal coordinate system. The X direction refers to the length direction L of the multilayer ceramic capacitor 1 and the multilayer body 10, the Y direction refers to the width direction W of the multilayer ceramic capacitor 1 and the multilayer body 10, and the Z direction refers to the lamination (stacking) direction T of the multilayer ceramic capacitor 1 and the multilayer body 10. Thus, the cross section shown in FIG. 2 is also referred to as a cross section LT, and the cross section shown in FIG. 3 is also referred to as a cross section WT.

The length direction L, the width direction W, and the lamination direction T are not necessarily orthogonal or substantially orthogonal to each other, and may intersect each other.

The multilayer body 10 includes a rectangular or substantially rectangular parallelepiped shape, and includes a first main surface TS1 and a second main surface TS2 which are opposed to each other in the lamination direction T, a first side surface WS1 and a second side surface WS2 which are opposed to each other in the width direction W, and a first end surface LS1 and a second end surface LS2 which are opposed to each other in the length direction L.

The corners and ridges of the multilayer body 10 are preferably rounded. The corners are each a portion where the three surfaces of the multilayer body 10 intersect, and the ridges are each a portion where the two surfaces of the multilayer body 10 intersect.

As shown in FIGS. 2 and 3, the multilayer body 10 includes a plurality of dielectric layers 20 and a plurality of internal electrode layers 30 laminated in the lamination direction T. Furthermore, the multilayer body 10 includes an inner layer portion 100, and a first outer layer portion 101 and a second outer layer portion 102 that sandwich the inner layer portion 100 in the lamination direction T.

The inner layer portion 100 includes a portion of the plurality of dielectric layers 20 and a plurality of internal electrode layers 30. In the inner layer portion 100, the plurality of internal electrode layers 30 are opposed to each other with the dielectric layers 20 interposed therebetween. The inner layer portion 100 generates capacitance and substantially defines and functions as a capacitor.

The first outer layer portion 101 is provided adjacent to the first main surface TS1 of the multilayer body 10, and the second outer layer portion 102 is provided adjacent to the second main surface TS2 of the multilayer body 10. More specifically, the first outer layer portion 101 is provided between the internal electrode layer 30 closest to the first main surface TS1 of the plurality of internal electrode layers 30 and the first main surface TS1, and the second outer layer portion 102 is provided between the internal electrode layer 30 closest to the second main surface TS2 of the plurality of internal electrode layers 30 and the second main surface TS2. The first outer layer portion 101 and the second outer layer portion 102 do not include the internal electrode layers 30, but include portions of the plurality of dielectric layers 20 other than portions for the inner layer portion 100. The first outer layer portion 101 and the second outer layer portion 102 define and function as protective layers of the inner layer portion 100.

As a material of the dielectric layers 20, for example, a dielectric ceramic including $BaTiO_3$, $CaTiO_3$, $SrTiO_3$, $CaZrO_3$, or the like as a main component can be used. Furthermore, as a material of the dielectric layers 20, for example, a Mn compound, an Fe compound, a Cr compound, a Co compound, a Ni compound, or the like may be added as a subcomponent.

The thickness of the dielectric layer 20 is not particularly limited, but is preferably, for example, about 0.40 μm or more and about 0.50 μm or less, and more preferably about 0.40 μm or more and about 0.45 μm or less. The number of dielectric layers 20 is not particularly limited, but is preferably, for example, 100 or more and 2000 or less. The number of the dielectric layers 20 refers to a total number of the number of the dielectric layers of the inner layer portion and the number of the dielectric layers of the outer layer portions.

The plurality of internal electrode layers 30 include a plurality of first internal electrode layers 31 and a plurality of second internal electrode layers 32. The plurality of first internal electrode layers 31 and the plurality of second internal electrode layers 32 are alternately provided in the lamination direction T of the multilayer body 10.

The first internal electrode layers 31 each include a counter electrode portion 311 and an extension electrode portion 312, and the second internal electrode layers 32 each include a counter electrode portion 321 and an extension electrode portion 322.

The counter electrode portion 311 and the counter electrode portion 321 are opposed to each other with a dielectric layer 20 interposed therebetween in the lamination direction T of the multilayer body 10. The shapes of the counter electrode portion 311 and the counter electrode portion 321 are not particularly limited, and may be rectangular or substantially rectangular, for example. The counter electrode portion 311 and the counter electrode portion 321 are portions which substantially define and function as capacitors for generating capacitances.

The extension electrode portions 312 each extend from the counter electrode portion 311 toward the first end surface LS1 of the multilayer body 10, and are each exposed at the first end surface LS1. The extension electrode portions 322 each extend from the counter electrode portion 321 toward the second end surface LS2 of the multilayer body 10, and are each exposed at the second end surface LS2. The shapes of the extension electrode portion 312 and the extension electrode portion 322 are not particularly limited, and may be rectangular or substantially rectangular, for example.

Thus, the first internal electrode layers 31 are each connected to the first external electrode 41, and a gap exists between each of the first internal electrode layers 31 and the second end surface LS2 of the multilayer body 10, i.e., the second external electrode 42. Furthermore, the second internal electrode layers 32 are each connected to the second external electrode 42, and a gap exists between each of the second internal electrode layers 32 and the first end surface LS1 of the multilayer body 10, i.e., the first external electrode 41.

The first internal electrode layer 31 and the second internal electrode layer 32 include, for example, Ni as a main component. Furthermore, the first internal electrode layer 31 and the second internal electrode layer 32 may include, for example, at least one selected from metals such as Cu, Ag, Pd, and Au or alloys including at least one of these metals such as Ag—Pd alloy as a main component, or may include a component other than the main component. Furthermore, the first internal electrode layer 31 and the second internal electrode layer 32 may include, for example, dielectric particles having the same composition as the ceramic included in the dielectric layer 20 as components other than the main component. In the present disclosure, the metal of the main component is defined as a metal component having the highest weight %.

The thicknesses of the first internal electrode layer 31 and the second internal electrode layer 32 are not particularly limited, but are preferably, for example, about 0.30 μm or more and about 0.40 μm or less, and more preferably about 0.30 μm or more and about 0.35 μm or less. The number of the first internal electrode layers 31 and the second internal electrode layers 32 is not particularly limited, but is preferably, for example, 10 or more and 1000 or less.

As shown in FIG. 3, the multilayer body 10 includes an electrode counter portion W30 in which the internal electrode layers 30 are opposed to each other in the width direction W, and a first side gap portion WG1 and a second side gap portion WG2 that sandwich the electrode counter portion W30. The first side gap portion WG1 is positioned between the electrode counter portion W30 and the first side surface WS1, and the second side gap portion WG2 is positioned between the electrode counter portion W30 and the second side surface WS2. More specifically, the first side gap portion WG1 is positioned between the end of the internal electrode layer 30 adjacent to the first side surface WS1 and the first side surface WS1, and the second side gap portion WG2 is positioned between the end of the internal electrode layer 30 adjacent to the second side surface WS2 and the second side surface WS2. The first side gap portion WG1 and the second side gap portion WG2 do not include the internal electrode layers 30, and include only the dielectric layers 20. The first side gap portion WG1 and the second side gap portion WG2 are portions functioning as protective layers of the internal electrode layer 30. The first side gap portion WG1 and the second side gap portion WG2 are each also referred to as a W gap.

As shown in FIG. 2, the multilayer body 10 includes an electrode counter portion L30 in which the first internal electrode layers 31 and the second internal electrode layers 32 of the internal electrode layer 30 are opposed to each other in the length direction L, a first end gap portion LG1, and a second end gap portion LG2. The first end gap portion LG1 is positioned between the electrode counter portion L30 and the first end surface LS1, and the second end gap portion LG2 is positioned between the electrode counter portion L30 and the second end surface LS2. More specifically, the first end gap portion LG1 is positioned between the ends of the second internal electrode layers 32 adjacent to the first end surface LS1 and the first end surface LS1, and the second end gap portion LG2 is positioned between the ends of the first internal electrode layer 31 adjacent to the second end surface LS2 and the second end surface LS2. The first end gap portion LG1 does not include the second internal electrode layers 32 and includes the first internal electrode layers 31 and the dielectric layers 20, and the second end gap portion LG2 does not include the first internal electrode layers 31 and includes the second internal electrode layers 32 and the dielectric layers 20. The first end gap portion LG1 functions as an extension electrode portion toward the first end surface LS1 of the first internal electrode layers 31, and the second end gap portion LG2 functions as an extension electrode portion to the second end surface LS2 of the second internal electrode layers 32. The first end gap portion LG1 and the second end gap portion LG2 are each also referred to as an L gap.

The counter electrode portions 311 of the first internal electrode layers 31 and the counter electrode portions 321 of the second internal electrode layers 32 are positioned in the electrode counter portion L30. Furthermore, the extension electrode portions 312 of the first internal electrode layers 31 are positioned in the first end gap portion LG1, and the extension electrode portions 322 of the second internal electrode layers 32 are positioned in the second end gap portion LG2.

The dimensions of the multilayer body 10 are not particularly limited, but, for example, the length in the length direction L is preferably about 0.05 mm or more and about 1.00 mm or less, the width in the width direction W is preferably about 0.10 mm or more and about 0.50 mm or less, and the thickness in the lamination direction T is preferably about 0.10 mm or more and about 0.50 mm or less. In the multilayer body 10, when the dimension in the length direction L is defined as L1, the dimension in the width direction W is defined as W1, and the dimension in the lamination direction T is defined as T1, L1>T1>W1 may be satisfied. As a result, it is possible to obtain a multilayer ceramic capacitor having a higher height and a large T1 while satisfying the predetermined L1 and W1, and it is possible to achieve a reduction in size and a higher capacitance.

As a method of measuring the thicknesses of the dielectric layers 20 and the internal electrode layers 30, for example, there is a method of observing the cross section LT in the vicinity of the center in the width direction of the multilayer body exposed by polishing with a scanning electron microscope. Furthermore, each value may be an average value of measurement values at a plurality of positions in the length direction, or may be an average value of measurement values at a plurality of positions in the lamination direction.

Similarly, as a method of measuring the thickness of the multilayer body 10, for example, there is a method of observing with a scanning electron microscope the cross section LT in the vicinity of the center in the width direction of the multilayer body exposed by polishing or the cross section WT in the vicinity of the center in the length direction of the multilayer body exposed by polishing. Furthermore, each value may be an average value of measurement values at a plurality of positions in the length direction or the width direction. Similarly, as a method of measuring the length of the multilayer body 10, for example, there is a method of observing the cross section LT in the vicinity of the center in the width direction of the multilayer body exposed by polishing with a scanning electron microscope. Furthermore, each value may be an average value of measurement values at a plurality of locations in the lamination direction. Similarly, as a method of measuring the width of the multilayer body 10, for example, there is a method of observing with a scanning electron microscope the cross section WT in the vicinity of the center in the length direction of the multilayer body exposed by polishing. Furthermore, each value may be an average value of measurement values at a plurality of locations in the lamination direction.

The external electrodes 40 include the first external electrode 41 and the second external electrode 42.

The first external electrode 41 is provided on the first end surface LS1 of the multilayer body 10 and is connected to the first internal electrode layers 31. The first external electrode 41 may extend from the first end surface LS1 to a portion of the first main surface TS1 and a portion of the second main surface TS2. Furthermore, the first external electrode 41 may extend from the first end surface LS1 to a portion of the first side surface WS1 and a portion of the second side surface WS2.

The second external electrode 42 is provided on the second end surface LS2 of the multilayer body 10 and is connected to the second internal electrode layers 32. The second external electrode 42 may extend from the second end surface LS2 to a portion of the first main surface TS1 and a portion of the second main surface TS2. The second external electrode 42 may extend from the second end surface LS2 to a portion of the first side surface WS1 and a portion of the second side surface WS2.

The first external electrode 41 includes a first base electrode layer 415 and a first plated layer 416, and the second external electrode 42 includes a second base electrode layer 425 and a second plated layer 426. The first external electrode 41 may include only the first plated layer 416, and the second external electrode 42 may include only the second plated layer 426.

The first base electrode layer 415 and the second base electrode layer 425 may be fired layers including, for example, metal and glass. Examples of the glass include glass components containing at least one selected from B, Si, Ba, Mg, Al, Li, and the like. As a specific example, borosilicate glass can be used. The metal includes, for example, Cu as a main component. For example, the metal may include at least one selected from metals such as Ni, Ag, Pd, or Au or alloys such as Ag—Pd alloy as a main component, or may include a component other than the main component.

The fired layer is a layer obtained by applying a conductive paste including a metal and glass to a multilayer body by, for example, a dipping method and firing the multilayer body. The firing may be performed after firing the internal electrode layer, or may be performed simultaneously with the internal electrode layer. The fired layer may include a plurality of layers.

Alternatively, the first base electrode layer 415 and the second base electrode layer 425 may each be, for example, a resin layer including electrically conductive particles and a thermosetting resin. The resin layer may be provided on the fired layer described above, or may be provided directly on the multilayer body without providing the fired layer.

The resin layer is a layer obtained by applying an electrically conductive paste including electrically conductive particles and a thermosetting resin to a multilayer body by, for example, a coating method and firing the multilayer body. The firing may be performed after firing the internal electrode layers, or may be performed simultaneously with the internal electrode layers. The resin layer may include a plurality of layers.

The thickness per layer of each of the first base electrode layer 415 and the second base electrode layer 425 defining and functioning as a fired layer or a resin layer is not particularly limited, and may be, for example, about 1 μm or more and about 10 μm or less.

Alternatively, the first base electrode layer 415 and the second base electrode layer 425 may be formed by a thin film formation method such as, for example, a sputtering method or a deposition method, and may be a thin film layer having a thickness of, for example, about 1 μm or less in which metal particles are deposited.

The first plated layer 416 covers at least a portion of the first base electrode layer 415, and the second plated layer 426 covers at least a portion of the second base electrode layer 425. Examples of the first plated layer 416 and the second plated layer 426 include at least one selected from metals such as Cu, Ni, Ag, Pd, or Au, or alloys such as an Ag—Pd alloy.

Each of the first plated layer 416 and the second plated layer 426 may include a plurality of layers. A two-layer structure including, for example, Ni plating and Sn plating is preferable. The Ni-plated layer can prevent the base electrode layer from being eroded by solder when the ceramic electronic component is mounted, and the Sn-plated layer can improve wettability of the solder when the ceramic electronic component is mounted, and thus can be easily mounted.

The thickness per layer of each of the first plated layer 416 and the second plated layer 426 is not particularly limited, and may be, for example, about 1 μm or more and about 10 μm or less.

As shown in FIGS. 1 to 3, in the mounting structure of the multilayer ceramic capacitor 1, the multilayer ceramic capacitor 1 is mounted on a circuit board CB such that the second main surface TS2 faces the circuit board CB.

Internal Electrode Layer

Figure 4:
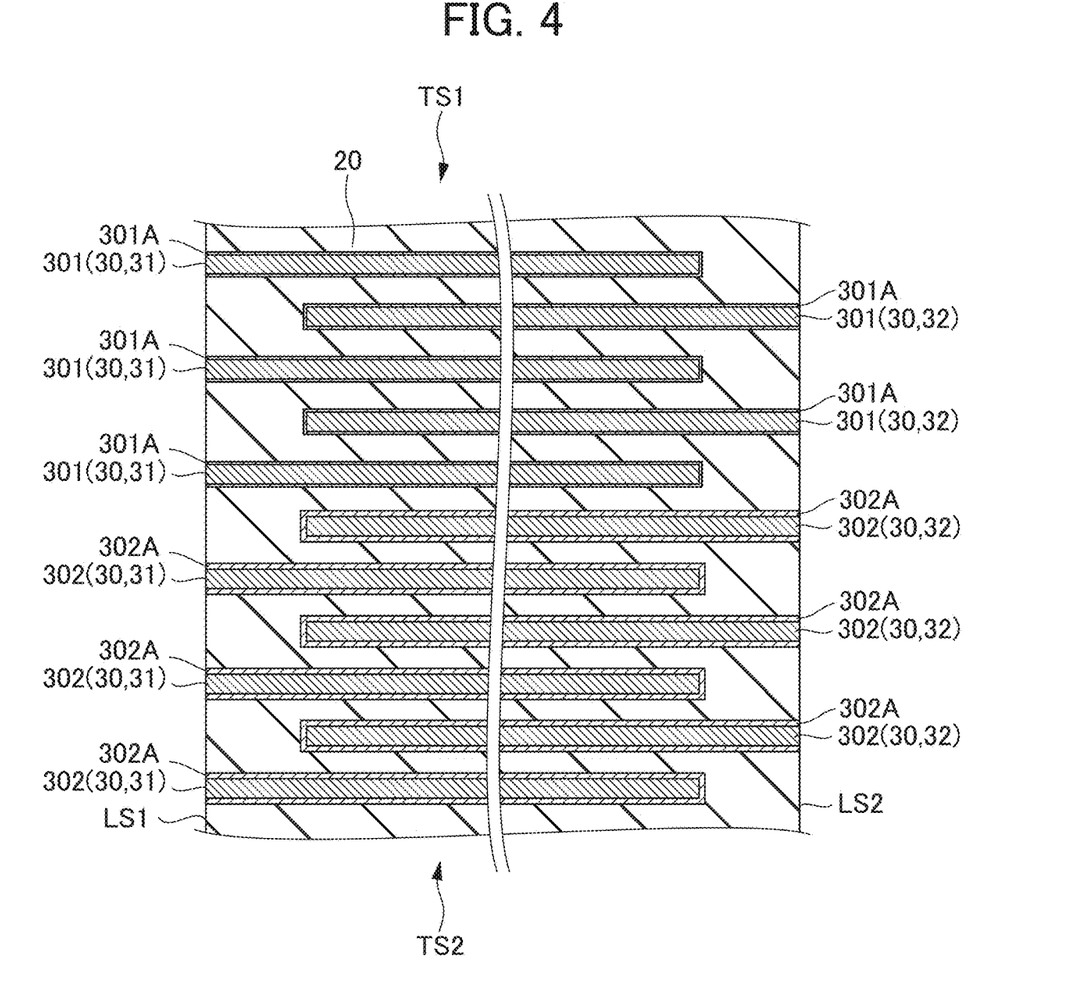
FIG. 4 is an enlarged cross-sectional view of internal electrode layers of a multilayer body in the multilayer ceramic capacitor shown in FIG. 2.

Next, the internal electrode layers 30, that is, the first internal electrode layers 31 and the second internal electrode layers 32, will be further described. FIG. 4 is an enlarged cross-sectional view of the internal electrode layers of the multilayer body in the multilayer ceramic capacitor shown in FIG. 2. As shown in FIG. 4, among the internal electrode layers 30, that is, among the first internal electrode layers 31 and the second internal electrode layers 32, internal electrode layers provided closer to the first main surface TS1 than the center in the lamination direction T of the multilayer body 10 are referred to as first main surface-side internal electrode layers 301, and internal electrode layers provided closer to the second main surface TS2 than the center in the lamination direction T of the multilayer body 10 are referred to as second main surface-side internal electrode layers 302.

Each of first solid solution layers 301A in which a subcomponent metal, for example, Sn, different from a main component metal, for example, Ni, is present as a solid solution is provided at an interface between the first main surface-side internal electrode layer 301 and the dielectric layer 20, the interface is included in the first main surface-side internal electrode layer 301. On the other hand, each of second solid solution layer 302A in which a subcomponent metal, for example, Sn, is present as a solid solution is provided on the interface between the second main surface-side internal electrode layer 302 and the dielectric layer 20, the interface is included in the second main surface-side internal electrode layer 302. The metal present as a solid solution in the first solid solution layer 301A and the second solid solution layer 302A may be, for example, at least one metal selected from Sn, In, Ga, Zn, Bi, Pb, Fe, V, Y, and Cu.

The concentration (content) of the subcomponent metal, for example, Sn in the second solid solution layer 302A is higher than the concentration (content) of the subcomponent metal, for example, Sn in the first solid solution layer 301A. The situation in which the concentration (content) of the subcomponent metal such as Sn is high in the internal electrode layer indicates that the concentration (content) of the main component metal such as, for example, Ni is low, that is, the coverage of the main component metal such as, for example, Ni is low.

By mounting the multilayer ceramic capacitor 1 on the circuit board CB with the second main surface TS2 side on which the internal electrode layer having low coverage of the main component metal such as, for example, Ni is provided facing the circuit board CB, it is possible to reduce or prevent the generation of "acoustic noise". Therefore, since there is no need to thicken the second outer layer portion 102, it is possible to provide more internal electrode layers 30, and it is also possible to make the multilayer ceramic capacitor 1 thinner (smaller) and higher in capacitance.

The content (molar ratio) of the subcomponent metal such as, for example, Sn in the first solid solution layer 301A is preferably, for example, about 0.2 mol % or more and about 0.8 mol % or less with respect to the main component metal such as, for example, Ni and 100 mol. On the other hand, the content (molar ratio) of the subcomponent metal, for example, Sn, in the second solid solution layer 302A may be higher than that of the first solid solution layer 301A at, for example, about 1.5 mol % or more and about 2.5 mol % or less with respect to the main component metal, for example, Ni and 100 mol. The ratio of the first main surface-side internal electrode layers 301 including the first solid solution layers 301A to the total number of the internal electrode layers 30 is preferably, for example, about 60% or more, and the ratio of the second main surface-side internal electrode layers 302 including the second solid solution layers 302A to the total number of the internal electrode layers 30 is preferably, for example, about 40% or less.

Here, for example, the dielectric layers 20 may be thinned in order to make the multilayer ceramic capacitor 1 thinner (smaller) and higher in capacitance. However, the reduction in the thicknesses of the dielectric layers 20 may increase the intensity of the electric field applied per layer, and may lower the lifetime, i.e., reliability, of the multilayer ceramic capacitor 1.

In this respect, when the first solid solution layers 301A and the second solid solution layers 302A of the subcomponent metal such as, for example, Sn are provided at the interfaces between the dielectric layers 20 and the internal electrode layers 30, the insulating property is improved at the interfaces where the first solid solution layers 301A and the second solid solution layers 302A are provided, between the dielectric layers 20 and the internal electrode layers 30, and it is possible to reduce or prevent an increase in electric field intensity in the dielectric layer 20. Therefore, it is possible to reduce or prevent a decrease in the lifetime, i.e., reliability, of the multilayer ceramic capacitor 1.

When the content of the subcomponent metal such as, for example, Sn in the second solid solution layer 302A (and the first solid solution layer 301A) is less than about 1.5 mol %, the advantageous effects of including the subcomponent metal such as, for example, Sn described above is small. On the other hand, when the content of the subcomponent metal such as, for example, Sn in the first solid solution layer 301A (and the second solid solution layer 302A) exceeds about 2.5 mol %, the melting point of the internal electrode layer 30 decreases, and the main component metal of the internal electrode layer 30, e.g., Ni, may form beads. When the main component metal, for example, Ni, forms beads, the internal electrode layer 30 is locally thick, the dielectric layer 20 is locally thin, the electric field intensity locally increases, and the advantageous effects of the subcomponent metal such as Sn described above is canceled.

TEM analysis is included among examples of a method of measuring the molar ratio of the content (mol %) of the subcomponent metal such as, for example, Sn in the first solid solution layer 301A with respect to the main component metal such as, for example, Ni and 100 mol in the first main surface-side internal electrode layer 301 and the molar ratio of the content (mol %) of the subcomponent metal such as, for example, Sn in the second solid solution layer 302A with respect to the main component metal such as, for example, Ni and 100 mol in the second main surface-side internal electrode layer 302. The internal electrode layers provided in the lamination direction were divided into three regions, and the internal electrode layers at the center of each region were measured at 10 points in the in-plane direction at 10 nm inner side from the interface by TEM analysis, and averaged to obtain a molar ratio.

The thickness of the first solid solution layer 301A is preferably, for example, about 1 nm or more and about 20 nm or less. On the other hand, the thickness of the second solid solution layer 302A is preferably, for example, about 1 nm or more and about 20 nm or less. Examples of a method of measuring the thicknesses of the first solid solution layer 301A and the second solid solution layer 302A include a method of observing the cross section LT in the vicinity of the center in the width direction of the multilayer body exposed by polishing, similar to the above-described method of measuring the thicknesses of the dielectric layers 20 and the internal electrode layers 30. Examples of the measuring instrument include wavelength dispersive X-ray analysis (WDX) or energy dispersive X-ray analysis (EDX), and scanning electron microscope (SEM) or transmission electron microscope (TEM). In the first solid solution layer 301A, the content (molar ratio) of the subcomponent metal, for example, Sn, is about 0.2 mol % or more and about 0.8 mol % or less with respect to 100 mol of the main component metal, for example, Ni, and in the second solid solution layer 302A, the content (molar ratio) of the subcomponent metal, for example, Sn is about 1.5 mol % or more and about 2.5 mol % or less with respect to 100 mol of the main component metal, for example, Ni.

Manufacturing Method

Next, a non-limiting example of a method of manufacturing the above-described multilayer ceramic capacitor 1 will be described. First, a dielectric sheet for forming the dielectric layer 20 and an electrically conductive paste for forming the internal electrode layer 30 are provided. The dielectric sheet includes Sn. For example, an insulator sheet including dielectric grains of a core-shell structure whose surface is coated with Sn is used. The content of Sn in the dielectric sheet is made different between the dielectric sheet adjacent to the first main surface-side internal electrode layer 301 and the dielectric sheet adjacent to the second main surface-side internal electrode layer 302. The dielectric sheet and the conductive paste include a binder and a solvent. As the binder and the solvent, well-known materials can be used.

Next, an internal electrode pattern is formed on the dielectric sheet by printing an electrically conductive paste on the dielectric sheet in a predetermined pattern, for example. Examples of a method of forming the internal electrode pattern include screen printing, gravure printing, or the like.

Next, a predetermined number of dielectric sheets for forming the second outer layer portion 102 on which no internal electrode pattern is printed are laminated. A dielectric sheet for forming the inner layer portion 100 on which the internal electrode pattern is printed is sequentially laminated thereon. A predetermined number of dielectric sheets for forming the first outer layer portion 101 on which no internal electrode pattern is printed are laminated thereon. Thus, a laminated sheet is produced.

Next, the laminated sheet is pressed in the lamination direction by means such as hydrostatic pressing to produce a laminated block. Next, the laminated block is cut into a predetermined size, and the laminated chip is cut out. At this time, the corners and ridges of the laminated chip are rounded by barrel polishing or the like.

Next, the laminated chip is fired to produce a multilayer body 10. The firing temperature is preferably, for example, about 900° C. or higher and about 1400° C. or lower, although it depends on the material of the dielectric and the internal electrode. At this time, solid solution layers, in which Sn originating from the dielectric layer 20 is segregated and present as a solid solution, are formed at the interfaces between the internal electrode layers 30 and the dielectric layers 20, the interfaces are included in the internal electrode layers 30. For example, as described above, by making the content of Sn different between the dielectric sheet adjacent to the first main surface-side internal electrode layer 301 and the dielectric sheet adjacent to the second main surface-side internal electrode layer 302, the first solid solution layers 301A in which Sn originating from the dielectric layer 20 is segregated and present as a solid solution are formed at the interfaces between the first main surface side internal electrode layers 301 and the dielectric layers 20, the interfaces are included in the first main surface side internal electrode layers 301, and the second solid solution layers 302A in which Sn originating from the dielectric layer 20 is segregated and present as a solid solution are formed at the interfaces between the second main surface side internal electrode layers 302 and the dielectric layers 20, the interfaces are included in the second main surface side internal electrode layers 302.

Next, by employing, for example, a dipping method to immerse the first end surface LS1 of the multilayer body 10 in an electrically conductive paste which is an electrode material for forming the base electrode layer, the electrically conductive paste for forming the first base electrode layer 415 is applied to the first end surface LS1. Similarly, by employing, for example, the dipping method to immerse the second end surface LS2 of the multilayer body 10 in an electrically conductive paste which is an electrode material for forming the base electrode layer, the electrically conductive paste for forming the second base electrode layer 425 is applied to the second end surface LS2. Thereafter, these electrically conductive pastes are fired, such that a first base electrode layer 415 and a second base electrode layer 425, which are fired layers, are formed. The firing temperature is preferably, for example, about 600° C. or higher and about 900° C. or lower.

As described above, the first base electrode layer 415 and the second base electrode layer 425, which are resin layers, may be formed by applying an electrically conductive paste including electrically conductive particles and a thermosetting resin by a coating method and firing, or the first base electrode layer 415 and the second base electrode layer 425 which are thin films may be formed by a thin film formation method such as, for example, a sputtering method or a deposition method.

Thereafter, the first plated layer 416 is formed on the surface of the first base electrode layer 415 to form the first external electrode 41, and the second plated layer 426 is formed on the surface of the second base electrode layer 425 to form the second external electrode 42. Through the above steps, the above-described multilayer ceramic capacitor 1 is obtained.

As described above, according to the multilayer ceramic capacitor 1 of the present preferred embodiment, the first solid solution layers 301A in which the subcomponent metal, for example, Sn, different from the main component metal, for example, Ni, is present as a solid solution, are formed in the first main surface-side internal electrode layers 301 provided adjacent to the first main surface TS1, and the second solid solution layers 302A in which the subcomponent metal, for example, Sn, different from the main component metal, for example, Ni, is present as a solid solution, are formed in the second main surface-side internal electrode layers 302 provided adjacent to the second main surface TS2. Furthermore, the concentration (content) of the subcomponent metal, for example, Sn, in the second solid solution layers 302A is higher than the concentration (content) of the subcomponent metal, for example, Sn, in the first solid solution layer 301A. The situation in which the concentration (content) of the subcomponent metal such as, for example, Sn is high in the internal electrode layer indicates that the concentration (content) of the main component metal such as, for example, Ni is low, that is, the coverage of the main component metal such as, for example, Ni is low.

By mounting the multilayer ceramic capacitor 1 on the circuit board CB with the second main surface TS2 side on which the internal electrode layer having low coverage of the main component metal such as, for example, Ni is provided facing the circuit board CB, it is possible to reduce or prevent generation of "acoustic noise". Therefore, since there is no need to thicken the second outer layer portion 102, it is possible to provide more internal electrode layers 30, and it is also possible to make the multilayer ceramic capacitor 1 thinner (smaller) and higher in capacitance. Therefore, it is possible to reduce or prevent the generation of "acoustic noise" without reducing or preventing the reduction in thickness (reduction in size) and the increase in capacitance of the multilayer ceramic capacitor 1.

Although preferred embodiments of the present invention have been described above, the present invention is not limited to the preferred embodiments described above, and various changes and modifications thereto are possible. For example, in the above-described preferred embodiments, the multilayer ceramic capacitor is exemplified in which the boundary between the first main surface-side internal electrode layer 301 and the second main surface-side internal electrode layer 302 is in the vicinity of the center of the multilayer body 10 in the lamination direction T. However, the present invention is not limited thereto, and the boundary between the first main surface-side internal electrode layer 301 and the second main surface-side internal electrode layer 302 may be offset toward the first main surface TS1 or toward the second main surface TS2. Alternatively, an internal electrode layer different from these internal electrode layers may be further provided between the first main surface-side internal electrode layer 301 and the second main surface-side internal electrode layer 302. For example, the concentration (content) of the subcomponent metal such as Sn in the solid solution layers of the internal electrode layers from the first main surface TS1 to the second main surface TS2 may increase in two or more stages, or no solid solution layer in which the subcomponent metal such as Sn is present as a solid solution may be provided in the internal electrode layers between the first main surface-side internal electrode layers 301 and the second main surface-side internal electrode layers 302.

Figure 5:
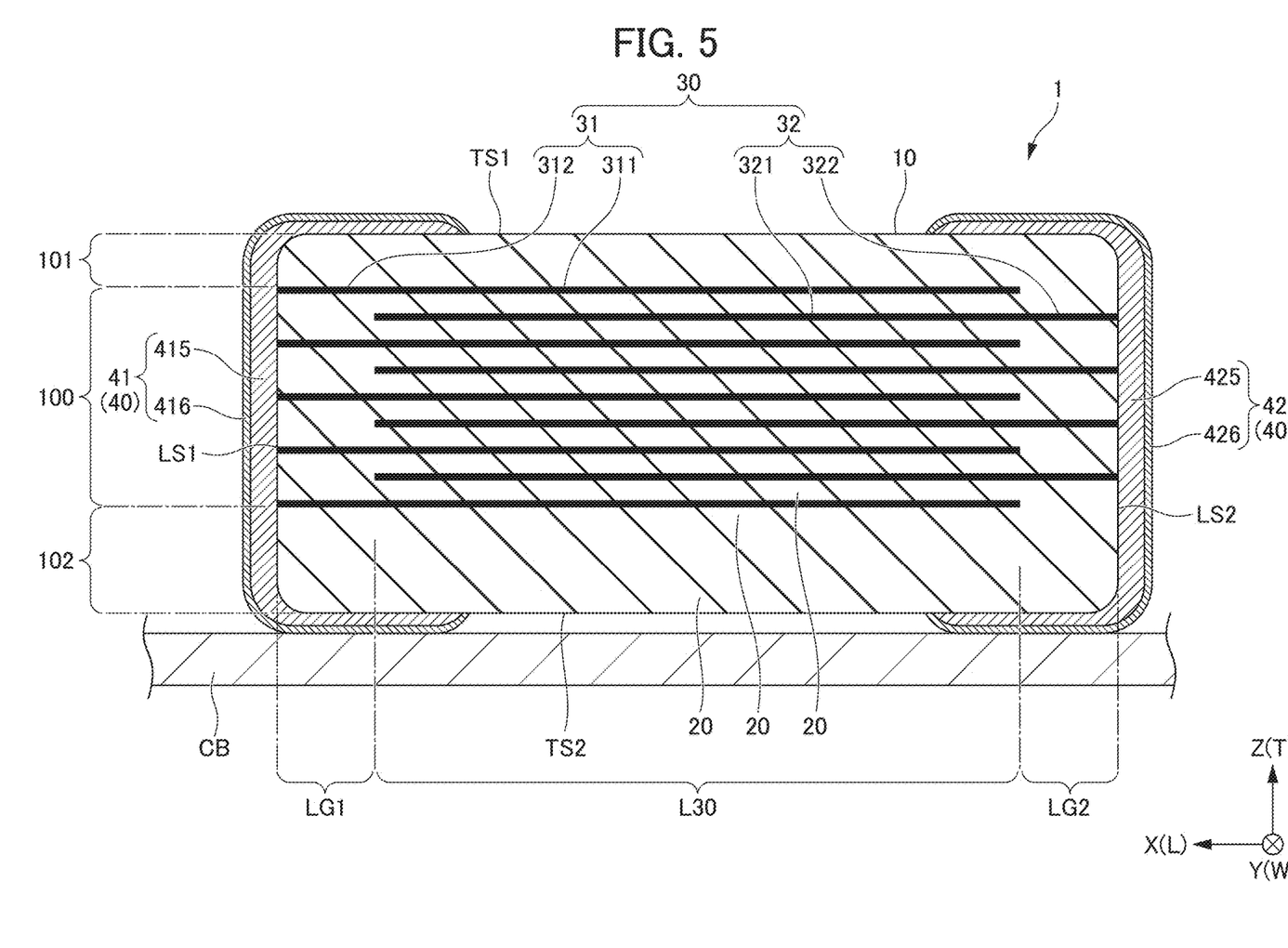
FIG. 5 is a sectional view (cross section LT) of a multilayer ceramic capacitor and a mounting structure of a multilayer ceramic capacitor according to a modified example of a preferred embodiment of the present invention.
Figure 6:
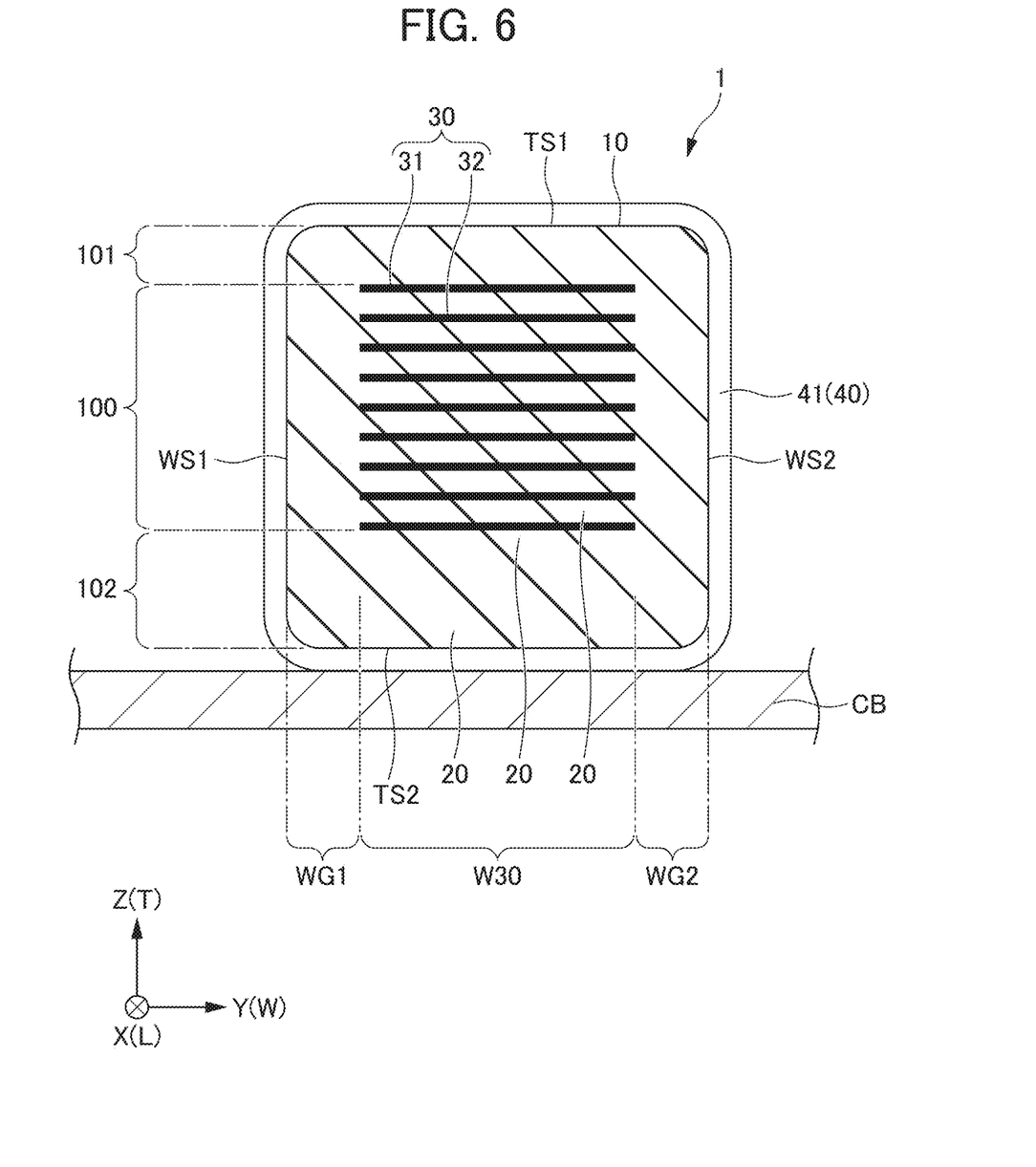
FIG. 6 is a cross-sectional view (cross section WT) of a multilayer ceramic capacitor and a mounting structure of a multilayer ceramic capacitor according to a modified example of a preferred embodiment of the present invention.

Furthermore, in the above-described preferred embodiments, the multilayer ceramic capacitor is exemplified in which the thickness of the second outer layer portion 102 is the same or substantially the same as the thickness of the first outer layer portion 101. However, the present invention is not limited thereto, and the second outer layer portion 102 may be thicker than the first outer layer portion 101, as shown in FIGS. 5 and 6. In other words, the interval between the internal electrode layer 30 closest to the second main surface TS2 and the second main surface TS2 may be larger than the interval between the internal electrode layer 30 closest to the first main surface TS1 and the first main surface TS1. In this modified example, the advantageous effects of reducing the thickness (the size) and increasing the capacitance is lower than that in the above-described preferred embodiments, but the advantageous effect of reducing or preventing the occurrence of "acoustic noise" is higher. Therefore, in this modified example, it is possible to reduce or prevent the generation of "acoustic noise" without significantly reducing or preventing the reduction in thickness (reduction in size) and the increase in capacitance of the multilayer ceramic capacitor 1.

The measuring method of the thicknesses of the first outer layer portion 101 and the second outer layer portion 102 may be the same as the measuring method of the thicknesses of the dielectric layer 20 and the internal electrode layer 30. For example, the cross section LT in the vicinity of the center in the width direction of the multilayer body exposed by polishing can be observed with a scanning electron microscope. Each value may be an average value of a plurality of measurement values in the length direction.

Furthermore, as a non-limiting example of a manufacturing method of the multilayer ceramic capacitor, a method of applying a dielectric of a side gap to the side surfaces WS1 and WS2 of the multilayer body 10 in the width direction W later may be applied. In this case, in the multilayer ceramic capacitor, both end portions of the internal electrode layer in the width direction W are aligned (e.g., aligned by an error of about 5 µm).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
    a multilayer body including a plurality of dielectric layers made of a ceramic material, a plurality of internal electrode layers laminated therein, a first main surface and a second main surface opposed to each other in a lamination direction, two side surfaces opposed to each other in a width direction which intersects the lamination direction, and two end surfaces opposed to each other in a length direction which intersects the lamination direction and the width direction; and
    two external electrodes at the two end surfaces of the multilayer body; wherein
    each of the plurality of internal electrode layers includes a first metal as a main component;
    among the plurality of internal electrode layers, internal electrode layers adjacent to the first main surface are defined as first main surface-side internal electrode layers, and internal electrode layers adjacent to the second main surface are defined as second main surface-side internal electrode layers;
    first solid solution layers, each including a second metal different from the first metal present as a solid solution, are provided at interfaces between the first main surface-side internal electrode layers and the dielectric layers, the interfaces being in the first main surface-side internal electrode layers;
    second solid solution layers, each including the second metal present as a solid solution, are provided at interfaces between the second main surface-side internal electrode layers and the dielectric layers, the interfaces being in the second main surface-side internal electrode layers; and
    a concentration of the second metal in the second solid solution layer is higher than a concentration of the second metal in the first solid solution layer.

2. The multilayer ceramic capacitor according to claim 1, wherein
    a content of the second metal in the first solid solution layer is about 0.2 mol % or more and about 0.8 mol % or less with respect to 100 mol of the first metal; and
    a content of the second metal in the second solid solution layer is about 1.5 mol % or more and about 2.5 mol % or less with respect to 100 mol of the first metal.

3. The multilayer ceramic capacitor according to claim 1, wherein, in the multilayer body, a dimension in the length direction is defined as L1, a dimension in the width direction is defined as W1, a dimension in the lamination direction is defined as T1, and a relationship of L1>T1>W1 is satisfied.

4. The multilayer ceramic capacitor according to claim 1, wherein
    the multilayer body includes an inner layer portion including a portion of the plurality of dielectric layers and the plurality of internal electrode layers, and a first outer layer portion and a second outer layer portion sandwiching the inner layer portion and each including a portion other than the portion of the plurality of dielectric layers, the first outer layer portion being adjacent to the first main surface, and the second outer layer portion being adjacent to the second main surface; and
    the second outer layer portion is thicker than the first outer layer portion.

5. The multilayer ceramic capacitor according to claim 1, wherein the first metal is Ni.

6. The multilayer ceramic capacitor according to claim 1, wherein the second metal is at least one of Sn, In, Ga, Zn, Bi, Pb, Fe, V, Y, or Cu.

7. The multilayer ceramic capacitor according to claim 1, wherein
a thickness of the first solid solution layer is about 1 nm or more and about 20 nm or less; and
a thickness of the second solid solution layer is about 1 nm or more and about 20 nm or less.

8. The multilayer ceramic capacitor according to claim 1, wherein
a ratio of the first main surface-side internal electrode layers to the plurality of internal electrode layers is about 60% or more; and
a ratio of the second main surface-side internal electrode layers to the plurality of the internal electrode layers is about 40% or less.

9. The multilayer ceramic capacitor according to claim 1, wherein the second metal is Sn.

10. The multilayer ceramic capacitor according to claim 1, wherein
the multilayer body includes an inner layer portion including a portion of the plurality of dielectric layers and the plurality of internal electrode layers, and a first outer layer portion and a second outer layer portion sandwiching the inner layer portion and each including a portion other than the portion of the plurality of dielectric layers, the first outer layer portion being adjacent to the first main surface, and the second outer layer portion being adjacent to the second main surface; and
a thickness of the second outer layer portion is the same or substantially the same as a thickness of the first outer layer portion.

11. A mounting structure of a multilayer ceramic capacitor, comprising:
a circuit board; and
a multilayer ceramic capacitor according to claim 1; wherein
the multilayer ceramic capacitor is mounted on the circuit board so that the second main surface faces the circuit board.

12. The mounting structure according to claim 11, wherein
a content of the second metal in the first solid solution layer is about 0.2 mol % or more and about 0.8 mol % or less with respect to 100 mol of the first metal; and
a content of the second metal in the second solid solution layer is about 1.5 mol % or more and about 2.5 mol % or less with respect to 100 mol of the first metal.

13. The mounting structure according to claim 11, wherein, in the multilayer body, a dimension in the length direction is defined as L1, a dimension in the width direction is defined as W1, a dimension in the lamination direction is defined as T1, and a relationship of L1>T1>W1 is satisfied.

14. The mounting structure according to claim 11, wherein
the multilayer body includes an inner layer portion including a portion of the plurality of dielectric layers and the plurality of internal electrode layers, and a first outer layer portion and a second outer layer portion sandwiching the inner layer portion and each including a portion other than the portion of the plurality of dielectric layers, the first outer layer portion being adjacent to the first main surface, and the second outer layer portion being adjacent to the second main surface; and
the second outer layer portion is thicker than the first outer layer portion.

15. The mounting structure according to claim 11, wherein the first metal is Ni.

16. The mounting structure according to claim 11, wherein the second metal is at least one of Sn, In, Ga, Zn, Bi, Pb, Fe, V, Y, or Cu.

17. The mounting structure according to claim 11, wherein
a thickness of the first solid solution layer is about 1 nm or more and about 20 nm or less; and
a thickness of the second solid solution layer is about 1 nm or more and about 20 nm or less.

18. The mounting structure according to claim 11, wherein
a ratio of the first main surface-side internal electrode layers to the plurality of internal electrode layers is about 60% or more; and
a ratio of the second main surface-side internal electrode layers to the plurality of the internal electrode layers is about 40% or less.

19. The mounting structure according to claim 11, wherein the second metal is Sn.

20. The mounting structure according to claim 11, wherein
the multilayer body includes an inner layer portion including a portion of the plurality of dielectric layers and the plurality of internal electrode layers, and a first outer layer portion and a second outer layer portion sandwiching the inner layer portion and each including a portion other than the portion of the plurality of dielectric layers, the first outer layer portion being adjacent to the first main surface, and the second outer layer portion being adjacent to the second main surface; and
a thickness of the second outer layer portion is the same or substantially the same as a thickness of the first outer layer portion.

* * * * *